United States Patent [19]

Smith

[11] Patent Number: 4,512,949
[45] Date of Patent: Apr. 23, 1985

[54] POWER PERFORMANCE MONITORING SYSTEM FOR NUCLEAR REACTOR FUEL CORE

[75] Inventor: Robert D. Smith, Bethesda, Md.

[73] Assignee: Scandpower, Inc., Bethesda, Md.

[21] Appl. No.: 511,683

[22] Filed: Jul. 7, 1983

Related U.S. Application Data

[62] Division of Ser. No. 229,797, Jan. 30, 1981, Pat. No. 4,411,858.

[51] Int. Cl.³ .............................................. G21C 17/00
[52] U.S. Cl. ..................................... 376/247; 376/259
[58] Field of Search .................... 376/247, 259; 73/1 F

[56] References Cited

U.S. PATENT DOCUMENTS 4,411,858 10/1983 Smith .................................. 376/247
4,411,859 10/1983 Smith et al. ......................... 376/247

Primary Examiner—Sal Cangialosi
Attorney, Agent, or Firm—Eric P. Schellin

[57] ABSTRACT

Direct power shape monitoring in parallel with precision power monitoring is effected by use of gamma sensors in the fuel core and signal processing that includes compensation for slow signal response and takes advantage of a substantially direct relationship of sensor signal to linear power generation rate. Continuous readout from the direct power shape monitor is available during readout interruptions in the precision monitor.

2 Claims, 6 Drawing Figures

POWER PERFORMANCE MONITORING SYSTEM FOR NUCLEAR REACTOR FUEL CORE

This is a division of application Ser. No. 229,797 filed Jan. 30, 1981, now U.S. Pat No. 4,411,858.

BACKGROUND OF THE INVENTION

This invention relates to anaylsis of fuel rod performance in a nuclear power plant reactor and more particularly to the monitoring of power density in a nuclear power reactor for analysis of fuel rod performance.

Fuel rod failure is a costly factor in nuclear power plant operation and has created a need for the development of an on-line, fuel failure avoidance system through which (a) the state of all fuel rods is continuously monitored, (b) the data obtained by monitoring is analyzed, and (c) fuel rod failure forecasts are generated as a result of such analysis.

The foregoing anaylsis function of such failure avoidance systems has involved the creation of a failure model from which to calculate the expected frequency of fuel failure in commercial nuclear power plant reactors. One such failure model developed is based on the concept of fuel rod failure resulting primarily from pellet-clad interaction. Experiments have shown that pellet-clad interaction failures occur either during rapid increases in power, referred to as "power shocks", or within a few hours thereafter. The power shocks produce thermal expansion, fission gas release, and shape distortion of the fuel pellets causing clad strain and longitudinal cracks in the fuel rod cladding. Pellet deformation also results in axial localization of strain at pellet joints. Other factors associated with pellet clad interaction are also believed to be responsible for fuel rod failure, but all such factors are consequences of power shocks.

Accurate and continuous monitoring of fuel rod power density is therefore essential in order to enable detection of power shocks and through a failure model as aforementioned to furnish a power utility operator with the information necessary to control power distribution by control rod movement and/or coolant flow rate control in a boiling water reactor or by control rod movement and/or boron concentration control in the moderator of a pressure water reactor.

The power density of the reactor has been monitored through sensors located in the fuel rod assembly. One type of sensor heretofore utilized for such purpose has been of the thermal neutron flux type. Although such neutron flux sensors provide power measurement signals that exhibit a rapid response to changes in local power density, they are unsatisfactory from two other important standpoints. First, the power measurement signal of a neutron flux sensor is not directly related to the linear heat generation rate of the fuel rod so that various calibration and correction factors must be introduced in order to approximate the rather complex relationship involved. Second, the neutron flux sensor has an emitter subject to burn-out.

According to prior copending application Ser. No. 888,881, filed Mar. 21, 1978 now U.S. Pat. No. 4,298,430, issued Nov. 3, 1981 owned in common with the present application, a local power density sensor is disclosed, which provides a signal output which is directly related to the linear heat generation rate for the fuel rods to enable more accurate determination of this parameter as compared to measurement by neutron flux sensors. Further, the sensor disclosed in the aforementioned prior patent is of the gamma radiation heat generating type which has no emitter subject to burn-out. However, the gamma ray sensor does not have a rapid signal response to changes in power as in the case of a neutron flux sensor which is in conflict with the requirement for real time local fuel power measurements in a fuel failure avoidance system.

It is therefore an important object of the present invention to provide a method of furnishing a nuclear power utility operator with real time, yet accurate, knowledge of local fuel power rate in the reactor core to enable operation of the power plant within adequate margins with respect to those operational parameters determined from local power measurements.

An additional object is to provide a power monitoring system for the fuel rods of the nuclear power reactor which benefits from the use of a gamma ray type of sensor.

SUMMARY OF THE INVENTION

In accordance with the present invention, a plurality of gamma ray sensors of the type disclosed in the aforementioned prior patent, provide input analog signals processed through two parallel paths to produce two separate power shape readouts that may be compared. One of the signal processing lines, generally known in the art, is of the precision type including a process computer into which various model parameters and correction factors are introduced from data storage to supply precision information to the utility operator from which fuel failure avoidance decisions may be made in the operation of the power plant. The other signal processing line directly converts the analog signals into a power readout as a function of local fuel power rates of fuel rods adjacent to the sensors by calibration of the analog signals. According to certain embodiments, both of the signal processing lines include a dynamic filter assembly through which a signal deconvolution process is performed in order to modify the readouts so as to compensate for delays caused by slow signal response of the sensors to changes in power. A continuous readout from the direct signal processing line may be compared with the precision readout of the signal processing line in parallel therewith to provide updated corrective calibration of the continuous readout. The continuous readout will provide the utility operator with information necessary to avoid plant shutdown during interruptions in the precision readout arising from computer downtime caused by updating of its data storage or other causes.

BRIEF DESCRIPTION OF DRAWING FIGURES

DETAILED DESCRIPTION OF PREFERRED EMBODIMENT

Figure 1:
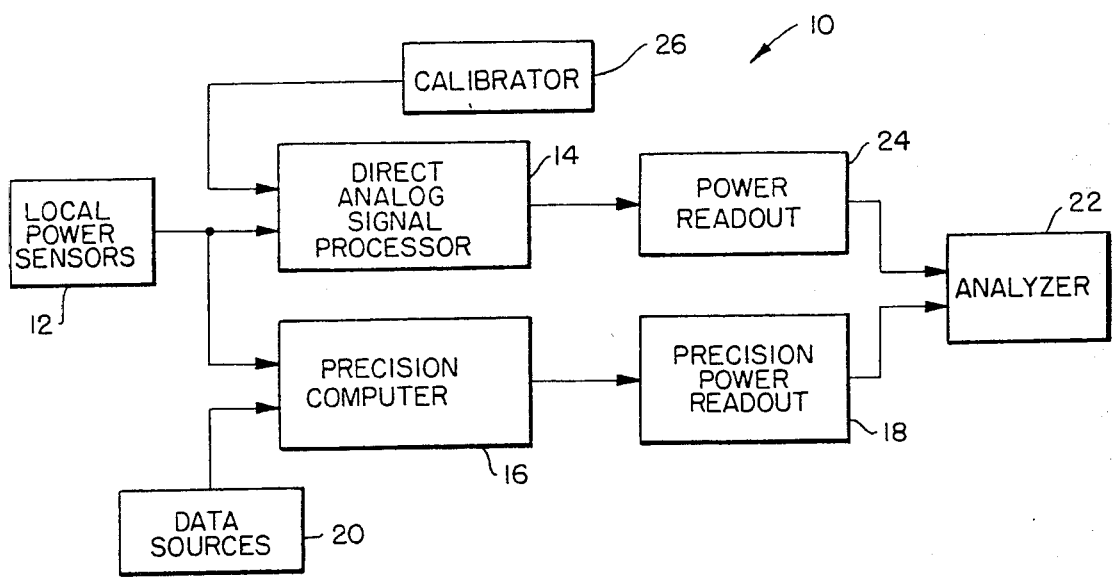
FIG. 1 is a schematic block diagram illustrating the basic power monitoring system of the present invention.

Referring now to the drawings in detail, FIG. 1 illustrates diagrammatically a local power monitoring system for the fuel assembly of a nuclear power reactor, the system being generally referred to by reference numeral 10. The row data acquisition for the system is located in the reactor fuel core and consists of a plurality of local power rate sensors generally referred to by reference numeral 12 in FIG. 1. The signal outputs of the sensors are fed along two parallel paths through a direct analog signal processing line 14 and a precision computer line 16 in order to produce an averaged power readout 24 and a precision power readout 18, respectively. Data input to the precision computer is obtained from other sources, including for example, information calculated from sensor sensitivity models, power shock models, and various correction factors such as core condition and time domain corrections. In the processing path of computer 16, the sensor signal lines are individually biased by precalibration to obtain precision heat rate measurements from the sensor signals which are converted into local fuel power outputs corrected in accordance with various plant condition parameters from the data sources denoted by reference numeral 20 in FIG. 1. The precision power readout 18 so obtained may be fed to an analyzer 22 to provide fuel power failure forecasts and power distribution recommendations for failure avoidance purposes. The analyzer may alternatively receive its input from the averages power readout 24 to which the signal processor 14 feeds its output in the form of local fuel power rate measurements. A calibrator 26 is connected to the signal processor 14 through which on-line correction of the processed signal output thereof may be effected by comparison of the readout 24 with the precision readout 18 while it is in operation. Thus the readout 24 may be operated continuously to provide the necessary information to the utility operator while computer 16 is non-functional in order to avoid power plant shut down because of interruptions in the supply of data to computer 16 for various reasons such as data updating.

Figure 2:
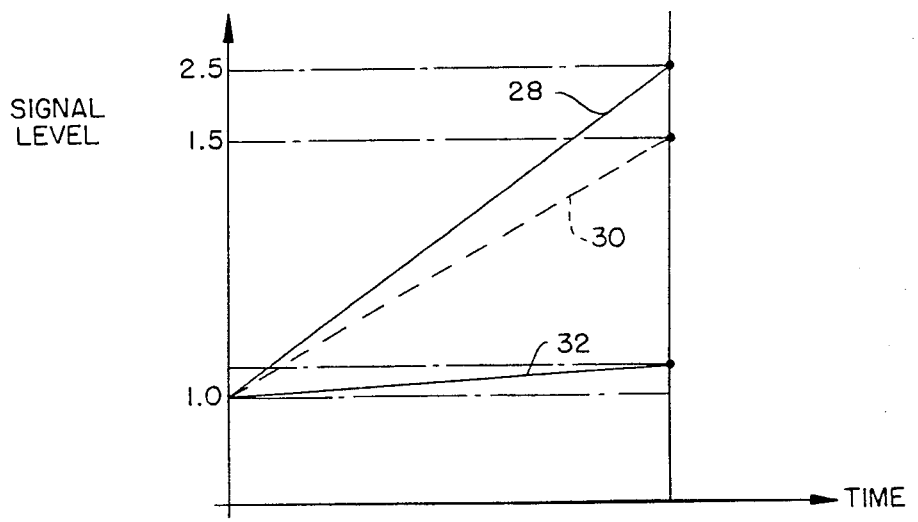
FIG. 2 is a graphical illustration of comparative sensor signal characteristics.

The type of sensor utilized in the power monitoring system of the present invention is very critical. As shown in FIG. 2, neutron flux sensors heretofore utilized for precision power monitoring purposes exhibited a significant change with time in signal level for a constant linear heat generation rate for a unit fuel rod length, as depicted by curve 28, assuming no emitter burn-out. With emitter burn-out compensation, the change in signal level for the neutron flux sensor is denoted by curve 30. In contrast thereto, the signal level change for a gamma sensor of the type disclosed in the aforementioned prior application is depicted by curve 32 in FIG. 2, requiring less drastic time domain correction.

Figure 3:
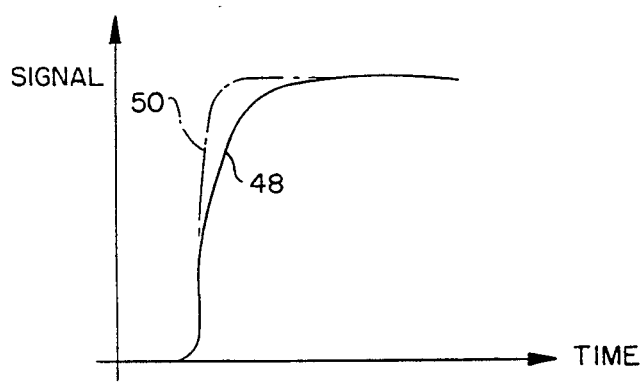
FIG. 3 is a graphical illustration of the sensor signal response correction effected in the power monitoring system.
Figure 5:
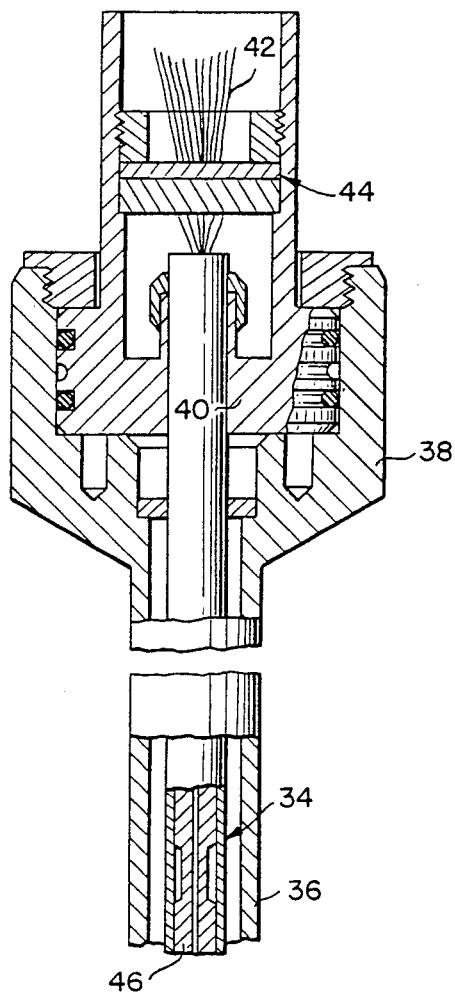
FIG. 5 is a partial section view of a typical signal cable connection to a sensor utilized in the system of the present invention.

FIG. 5 illustrates one of the gamma sensors 34 extending through a guide tube 36 from a reactor installation to the seal flange connector 38 located at an instrument removal zone, of a pressure water reactor, for example. The sensor extends through the seal flange 40 and the thermocouple signal cables 42 thereof project through the seal plug 44 to the power monitoring hardware. Thus, gamma radiation produced by fission products in the reactor fuel assembly cause internal heating of the inner core 46 of the sensor to generate the signals in the thermocouple cables 42. While these signals provide for more accurate determination of linear heat generation rate because of its substantially direct relationship thereto, there is a signal response delay when a change in power occurs, as exhibited by the signal characteristic curve 48 shown in FIG. 3. In accordance with the present invention, the signal is modified to compensate for such slow signal response as indicated by deconvoluted heating rate signal curve 50.

Figure 4:
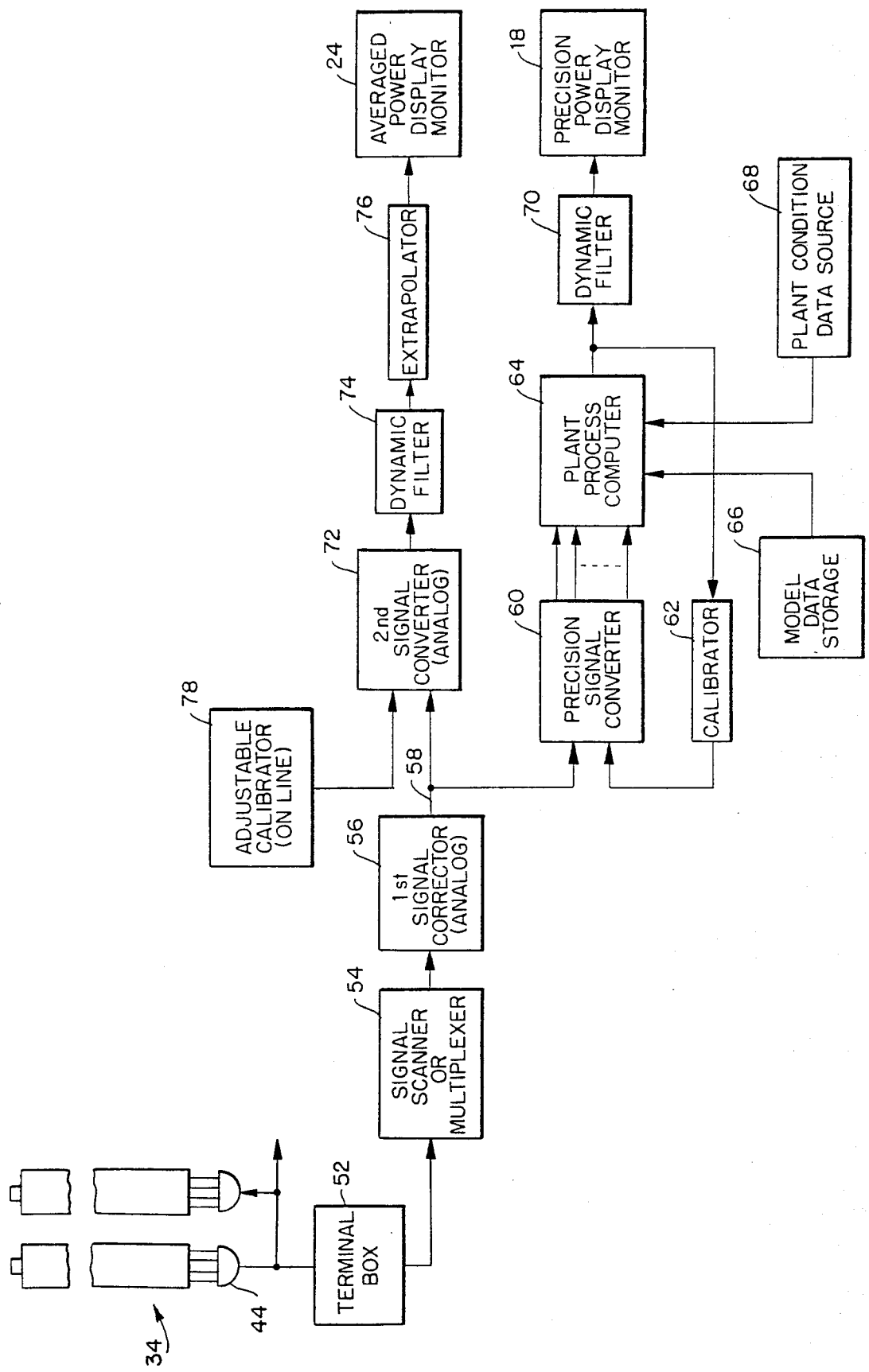
FIG. 4 is a schematic diagram of the power monitoring system showing a more specific embodiment of the present invention.

Referring now to FIG. 4, the signal cables from each of the sensors 34 are shown connected to a terminal box 52 thorough which signals of millivolt level are fed to a scanner or multiplexer 54. By way of example, eight sensors 34 are associated each fuel rod assembly of a reactor core and each sensor has two signal cables associated therewith to provide sixteen signal cables from each fuel rod assembly. In a light water reactor, between 350 to 450 of such signals are present to provide the local power rate measurements through the terminal box 52 to the scanner 54. The scanner may be a solid state multiplexer from which a signal sequence is fed to a first analog signal corrector 56 through which the signals are calibrated to provide a plurality of analog signals in signal path 58, representing local heat rates in the sensors.

The signal path 58 represents a plurality of signal lines fed in parallel to the direct analog processing line in the precision signal processing line as aforementioned in connection with FIG. 1. In the precision processing line, the input analog signals enter a precision signal converter 60 through which the sensor signals are given an individual bias and corrected in accordance with a signal sensitivity model though calibrator 62 in order to obtain precision heat rate signals that are fed to a plant process computer 64 which input data is also fed from model data storage 66 and plant condition data source 68. The signal output of the computer is then modified through a dynamic filter 70 to compensate for slow signal response as discussed with respect to FIG. 3. The signal output is then applied to the precision readout 18 in the form of a precision power display monitor furnishing local fuel power rate information for each fuel rod.

Direct conversion of the signals in path 58 to local power rate information is effected through a second signal converter 72 to produce outputs reflecting the local fuel power rate for fuel rods adjacent to each of the sensors. The signal outputs are then modified by a dynamic filter 74 and passed through an extrapolator 76 to the continuous display monitor 24 as averaged power rate information. Signal correction may be effected through a calibrator 78. A substantially accurate readout is obtained by such direct signal processing only because of the more accurate signal information furnished by sensors 34 and the measures taken to compensate for slow signal response and on-line calibration through calibrator 28 from comparison with data obtained from the precision monitor 18.

Figure 6:
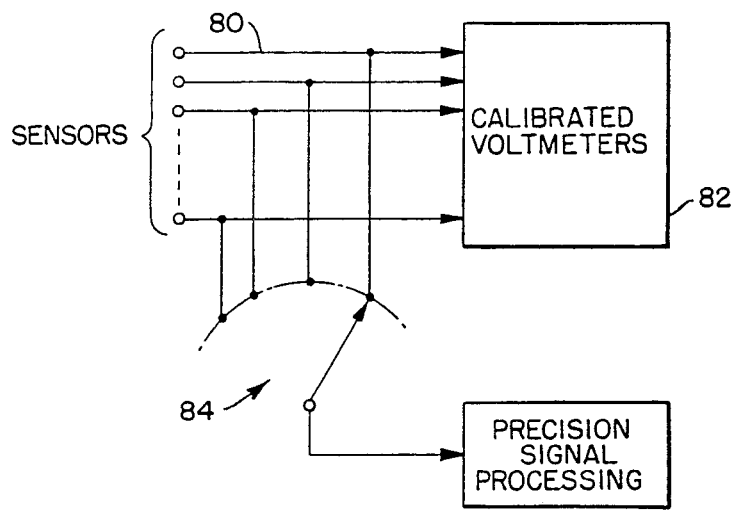
FIG. 6 is a schematic circuit diagram showing another less complex embodiment.

FIG. 6 illustrates a less complex version of the system insofar as the direct continuous signal processing path is concerned. The outputs of the sensors are fed through analog signal lines directly to calibrated voltmeters 82. The signals in these lines 80 are also fed to the contacts of a scanner 84 from which the signals are fed in sequence to the precision signal processing line 16 as hereinbefore described with respect to FIGS. 1 and 4.

I claim:
1. An electrical system for monitoring power developed in a nuclear reactor comprising:

sensors which generate heat in response to gamma radiation from fission products further generating electrical signals that are directly related to linear power generation rate of the fuel rods in said reactor;

a direct analog signal processor receiving said electrical signals from said sensors, said direct analog signal processor being controlled by an on line calibrator;

a precision computer receiving the same said electrical signals from said sensors, said precision computer having access to stored data sources on individual sensor precalibration and reactor condition parameters, said precision computer processing said signals and data into correct precision power signals;

a continuous power readout receiving an analog signal from said direct analog signal processor;

a precision power readout receiving a precision power signal from said precision computer; and an analyzer which receives signals from said precision power readout and said continuous power readout for converting said signals to fuel failure forecasts and power distribution recommendations for failure avoidance purposes.

2. An electrical system for monitoring power density in a nuclear reactor as in claim 1 where said precision computer includes:

a precision signal converter which recieves electrical signals from said sensors together with calibration signals;

a plant process computer which receives signals from said precision signal convertor, said plant process computer having access to stored data sources on individual sensor precalibration and plant conditions, said plant process computer supplying signals to a calibrator and for further processing before display; and a calibrator receiving signal from said plant process computer and supplying calibration signals to said precision signal convertor.

* * * * *